(12) United States Patent
Chen et al.

(10) Patent No.: US 7,539,010 B2
(45) Date of Patent: May 26, 2009

(54) COMPUTER ENCLOSURE WITH FASTENER

(75) Inventors: Yun-Lung Chen, Tu-Cheng (TW); Quan-Guang Du, Shenzhen (CN); Dong Qin, Shenzhen (CN)

(73) Assignees: Hong Fu jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 340 days.

(21) Appl. No.: 11/292,252

(22) Filed: Dec. 1, 2005

(65) Prior Publication Data

US 2006/0262494 A1    Nov. 23, 2006

(30) Foreign Application Priority Data

May 20, 2005    (CN) .................... 2005 2 0058741 U (51) Int. Cl.
*H05K 5/00* (2006.01)
*H05K 7/00* (2006.01)
*G06F 1/16* (2006.01)

(52) U.S. Cl. .................................................. 361/683
(58) Field of Classification Search ................ 361/683, 361/724, 725, 726; 439/53, 153, 157; 312/223, 312/223.1, 223.2; 16/404
See application file for complete search history.

(56) References Cited

U.S. PATENT DOCUMENTS

| | | | |
|---|---|---|---|
| 5,197,789 A | 3/1993 | Lin | |
| 5,446,618 A * | 8/1995 | Tetsuya et al. | 361/683 |
| 6,157,532 A * | 12/2000 | Cook et al. | 361/681 |
| 6,215,664 B1 * | 4/2001 | Hernandez et al. | 361/725 |
| 6,257,682 B1 * | 7/2001 | Liu et al. | 312/223.2 |
| 6,267,254 B1 * | 7/2001 | Chen | 211/26 |
| 6,272,008 B1 * | 8/2001 | Huang | 361/683 |
| 6,297,948 B1 * | 10/2001 | Buican et al. | 361/683 |
| 6,356,436 B1 * | 3/2002 | Buican et al. | 361/683 |
| 6,375,287 B1 * | 4/2002 | Lai | 312/223.2 |
| 6,375,288 B1 * | 4/2002 | Chen | 312/223.2 |
| 6,377,446 B1 * | 4/2002 | Liau | 361/683 |
| 6,583,983 B1 | 6/2003 | Chen et al. | |
| 6,616,106 B1 * | 9/2003 | Dean et al. | 248/27.1 |
| 6,775,144 B2 * | 8/2004 | Gan et al. | 361/727 |
| 6,816,391 B2 * | 11/2004 | Davis et al. | 361/818 |
| 6,899,407 B1 * | 5/2005 | Lai | 312/223.2 |
| 6,932,447 B2 * | 8/2005 | Chen et al. | 312/223.2 |
| 7,082,036 B2 * | 7/2006 | Cheng et al. | 361/726 |
| 7,142,431 B2 * | 11/2006 | Li et al. | 361/726 |
| 7,173,816 B2 * | 2/2007 | Song | 361/683 |
| 2002/0167790 A1 * | 11/2002 | Gan | 361/683 |
| 2004/0080916 A1 * | 4/2004 | Hsu et al. | 361/727 |
| 2005/0040740 A1 * | 2/2005 | Yun | 312/223.2 |

* cited by examiner

*Primary Examiner*—Anatoly Vortman
*Assistant Examiner*—Quinn Hunter (57) ABSTRACT

A computer enclosure includes a chassis (10) and a hood (20). A fastener (30) is movably attached to the chassis. The fastener defines an opening (35) and a slot (37) which are defined in different planes. The hood includes a tab (25) corresponding to the opening, and a hook (27) corresponding to the slot. The tab and the hook extend in directions corresponding to the opening and the slot respectively for inserting therein respectively. The tab is inserted into the opening for aligning the hook with the slot, whereupon the hook is inserted into the slot for securing the hood to the chassis.

16 Claims, 8 Drawing Sheets

COMPUTER ENCLOSURE WITH FASTENER

BACKGROUND OF THE INVENTION

1. Field of the Invention

The present invention relates to computer enclosures, and more particularly to a computer enclosure having a hood and a chassis, the hood being readily attached to and detached from the chassis by means of a fastener.

2. General Background

A conventional computer enclosure generally includes a chassis, a hood, and a bezel. The chassis is used to hold components such as motherboards, interface cards, a power supply, and disk drives. The chassis is generally U-shaped, and comprises a base, a front panel, and a rear panel. The hood is also U-shaped and has a top panel and two opposite side panels depending from the top panel. The hood is slidingly attached to the chassis along rails formed on opposite sides of the chassis, and then secured to the rear panel by screws. Finally, the bezel is mounted on the front panel of the chassis.

Securing the hood to the rear panel with screws is unduly complicated and time-consuming. Furthermore, it is difficult to simultaneously align the edges of both sides of the hood with their respective rails on the chassis.

Another kind of the conventional hood is secured to a chassis by means of engaging locking catches of the hood in slots of the chassis. However, disengaging this kind of hood from the chassis is unduly complicated and laborious.

What is needed, therefore, is a computer enclosure which has a fastener for readily mounting a hood to a chassis of the enclosure and readily removing the hood therefrom.

SUMMARY

A computer enclosure includes a chassis and a hood. A fastener is movably attached to the chassis. The fastener defines an opening and a slot which are defined in different planes. The hood includes a tab corresponding to the opening, and a hook corresponding to the slot. The tab and the hook extend in directions corresponding to the opening and the slot respectively for inserting therein respectively. The tab is inserted into the opening for aligning the hook with the slot, whereupon the hook is inserted into the slot for securing the hood to the chassis.

Other advantages and novel features will be drawn from the following detailed description of a preferred embodiment with attached drawings, in which:

DETAILED DESCRIPTION OF THE EMBODIMENTS

Figure 1:
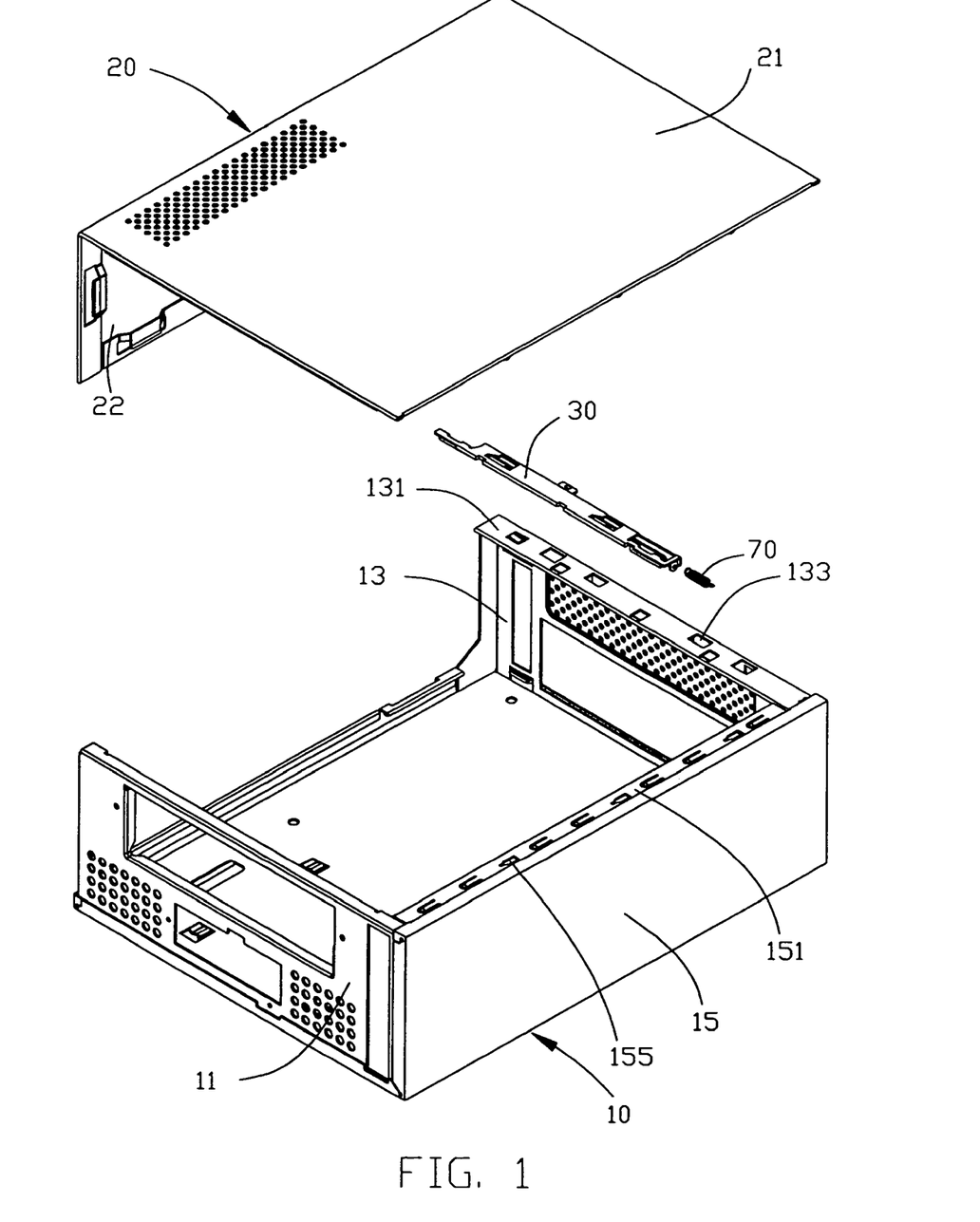
FIG. 1 is an exploded, isometric view of a preferred embodiment of a computer enclosure, including a hood, a chassis, and a fastener.

Referring to FIG. 1, an enclosure of an electronic device like a computer in accordance with a preferred embodiment of the present invention includes a chassis 10, a hood 20, and a fastener 30.

Figure 4:
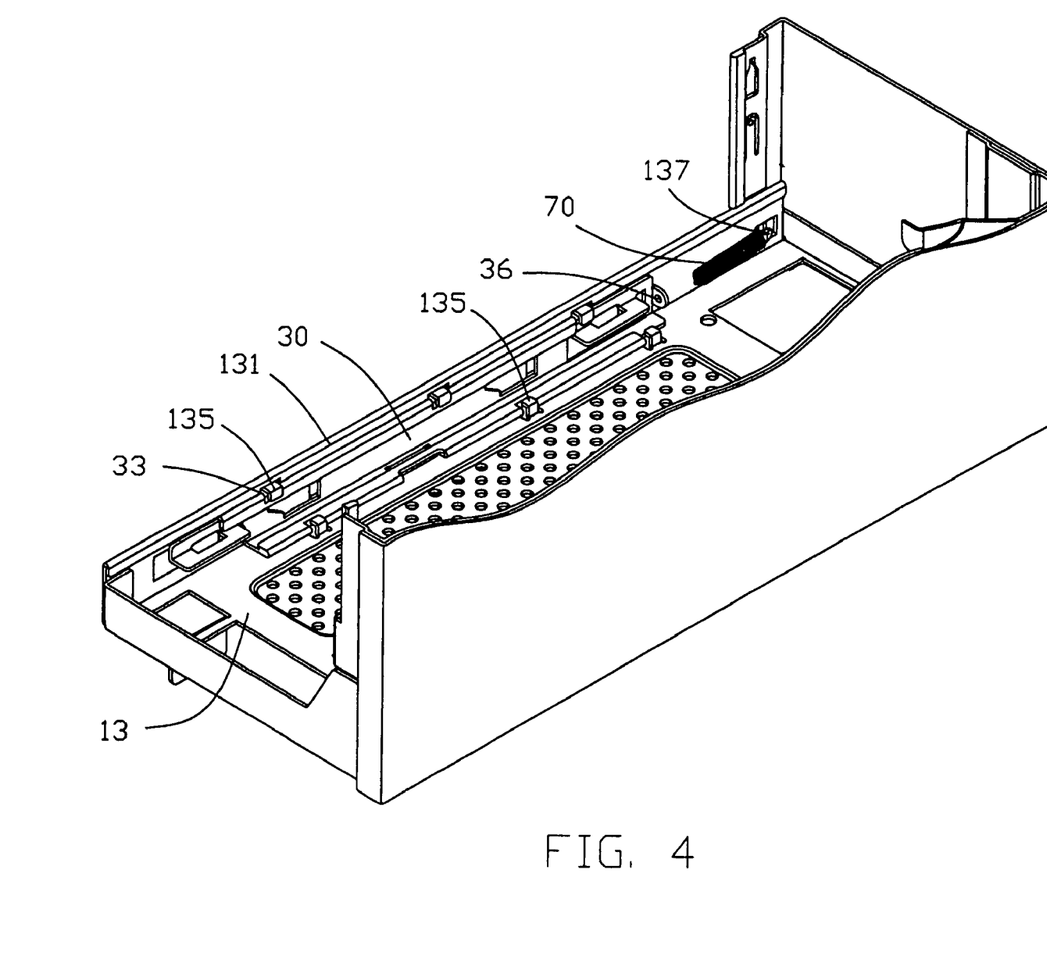
FIG. 4 is an isometric partial view of the chassis of FIG. 1 with the fastener attached.

The chassis 10 includes a front panel 11, a rear panel 13, and a side panel 15. A top edge of the rear panel 13 is bent perpendicularly inward to form a skirting panel 131 thereof. A plurality of holes 133 is defined in the skirting panel 131. A top edge of the side panel 15 is bent inward to form a flange 151 with a plurality of grooves 155. Referring also to FIG. 4, a pin 137 is formed from a bottom surface of the skirting panel 131. A plurality of L-shaped clasps 135 is formed on the skirting panel 131 and the rear panel 13.

Figure 2:
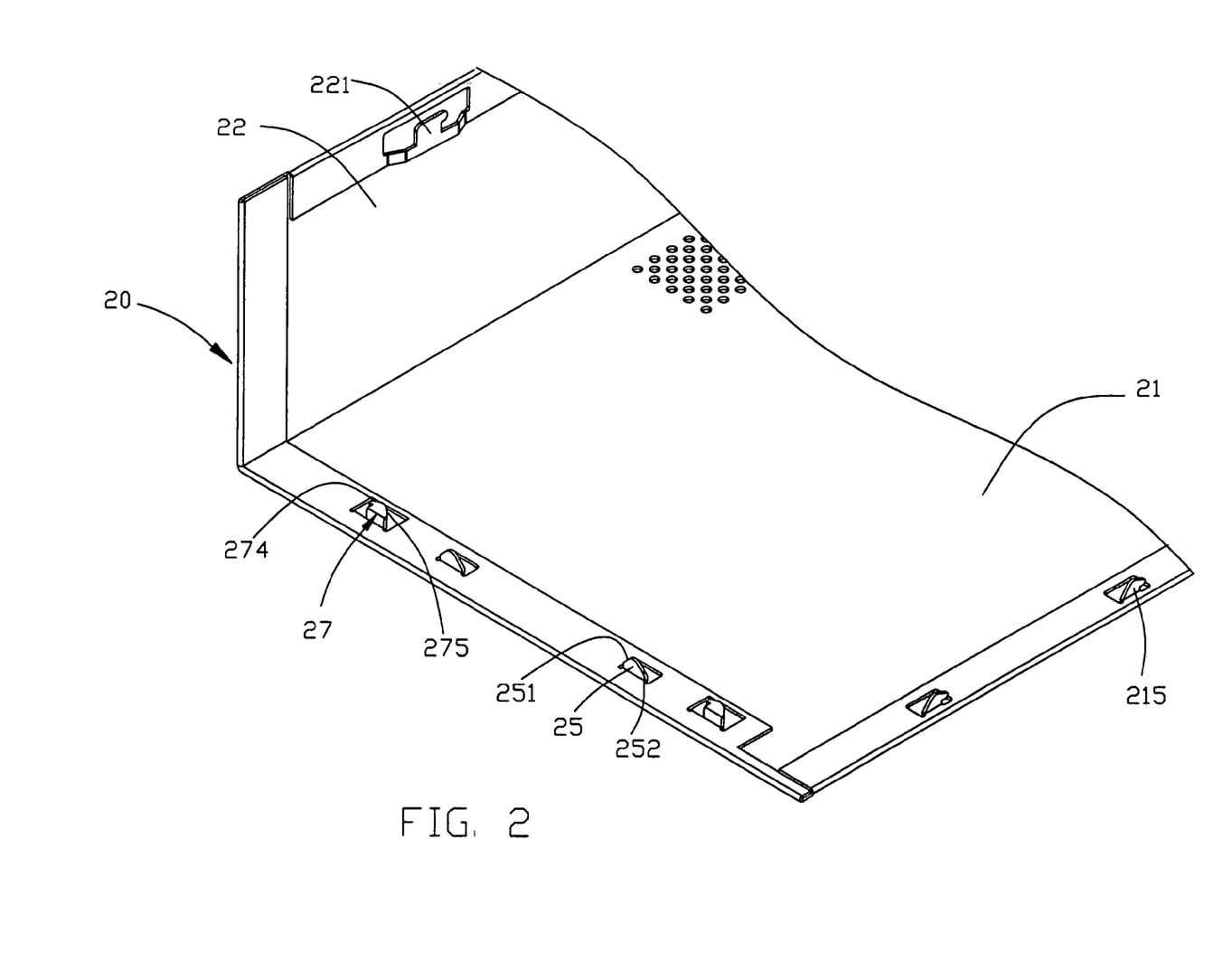
FIG. 2 is a partial view of the hood of FIG. 1.

Referring also to FIG. 2, the hood 20 includes a top panel 21 and a side panel 22 corresponding to the side panel 15. A pair of L-shaped hooks 27 protrude downward then forward from a bottom surface of the top panel 21 adjacent a rear edge of the top panel 21. The hooks 27 include first slopes 274 and second slopes 275. A pair of triangle tabs 25 protrude between the pair of hooks 27. The tabs 25 include first chamfers 251 and second chamfers 252. The side panel 22 includes a plurality of catches 221 formed thereon. A plurality of clips 215 is formed on one edge of the top panel 21 opposite to the side panel 22.

Figure 3:
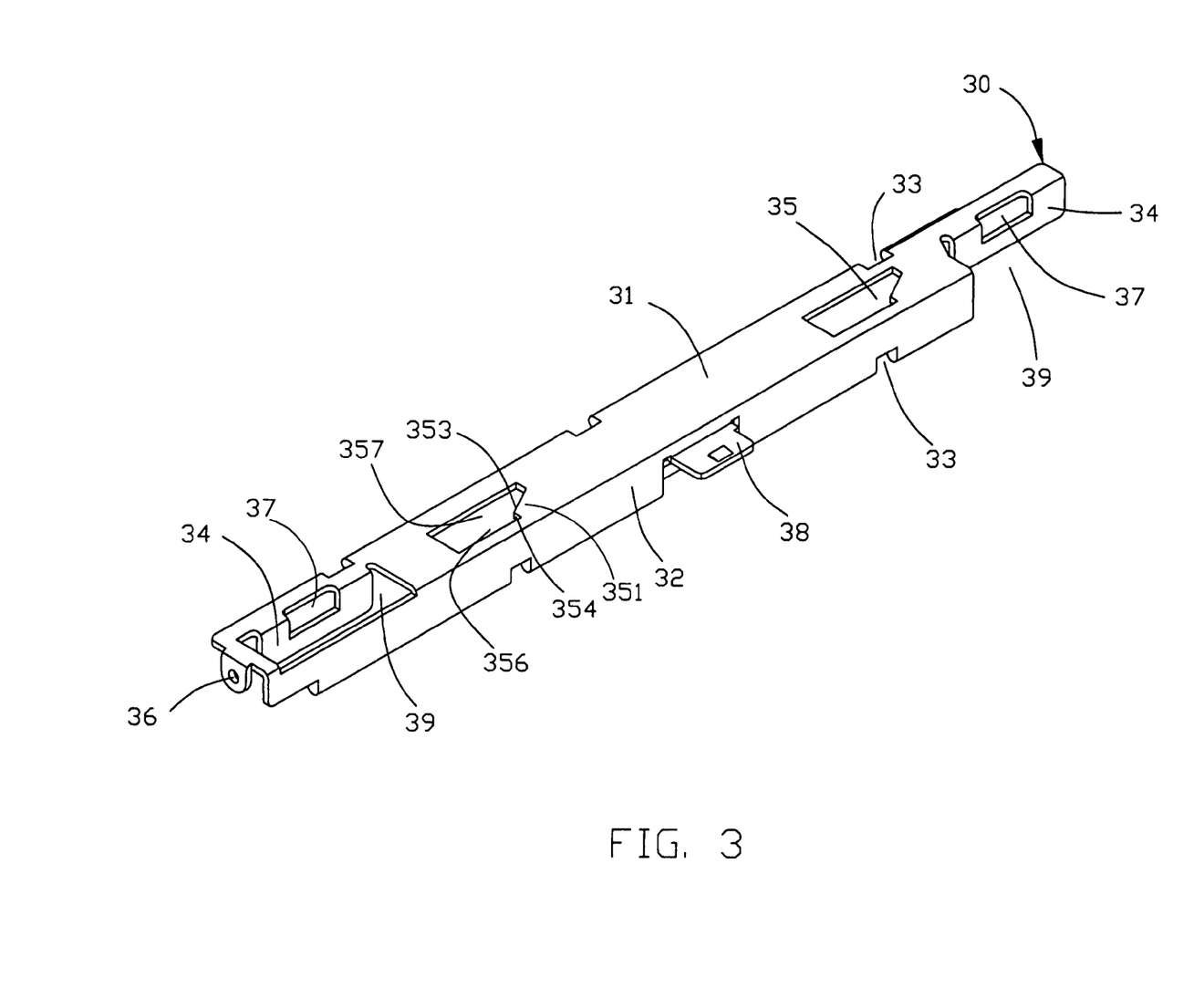
FIG. 3 is an isometric view of the fastener of FIG. 1.

Referring also to FIG. 3, the fastener 30 includes a first piece 31 and a second piece 32 perpendicular to the first piece 31. A plurality of cutouts 33 is defined in both the first piece 31 and the second piece 32. Opposite ends of the first piece 31 are stamped perpendicularly to form two folding flanges 34 and define two receiving openings 39 thereof. The folding flanges 34 each define a slot 37 therein. A pair of openings 35 is defined in the first piece 31. A triangle protrusion 351 protrudes from one corner of each of the openings 35 to divide the openings 35 into a wide portion 357 and a narrow portion 356. The protrusions 351 include an end surface 354 and a slanted guiding surface 353. A securing hole 36 is defined in one end of the first piece 31. A handle 38 is formed on the second piece 32 for conveniently manipulating the fastener 30.

Referring also to FIG. 4, the fastener 30 is put in the chassis 10 with the plurality of clasps 135 of the chassis 10 received in the plurality of cutouts 33 of the fastener 30. One end of a spring 70 is secured to the pin 137, and the other end is stretched to be retained in the securing hole 36. The spring 70 then spontaneously returns to its normal length, thus the fastener 30 slides. The clasps 135 restrict the sliding of the fastener 30. The openings 35 of the fastener 30 are in alignment with the holes 133 of the skirting panel 131 when the spring 70 is in its normal condition.

Figure 5:
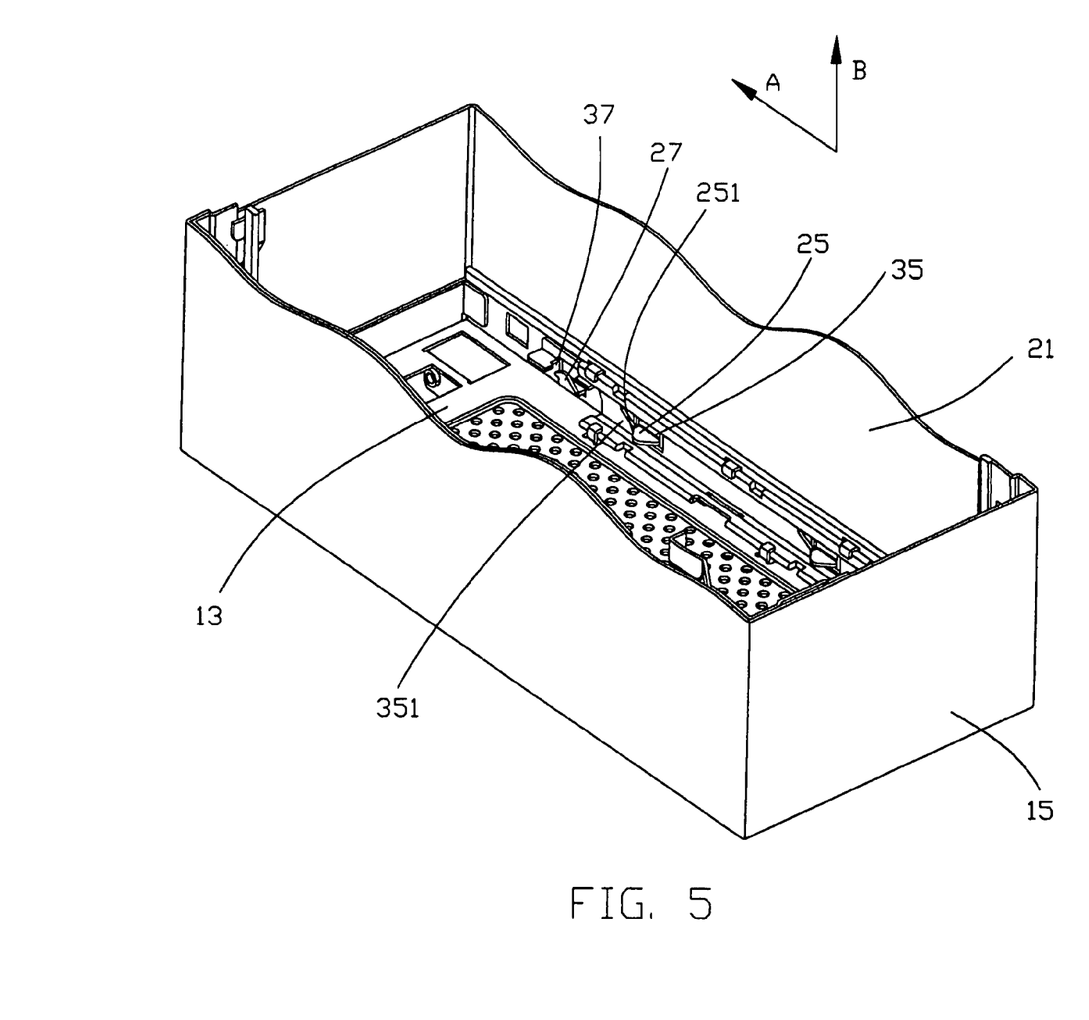
FIG. 5 is a partial pre-assembled view of the hood and the chassis of FIG. 1 attached by the fastener of FIG. 1.

Referring also to FIG. 5, in assembly, the hood 20 is put on the chassis 10 with the catches 221 catching on the chassis 10 and the clips 215 received in the grooves 155. A distance between the hook 27 and the first chamfer 251 of the adjacent tab 25 is longer than a distance between the slot 37 and the end surface 354 of the adjacent opening 35. The tabs 25 and the hooks 27 of the hood 20 extend through the holes 133 until the first chamfers 251 of the tabs 25 abut the end surfaces 354 of the openings 35. Then the hood 20 is pressed down with the first chamfers 251 sliding along the end surfaces 354 urging the fastener 30 to slide in direction A. Thus, the hooks 27 of the hood 20 are received in the receiving openings 39 and are in alignment with the slots 37 of the fastener 30 (The folding flanges 34 are partially cut-away in FIG. 5 for illustrating the invention more clearly).

Figure 6:
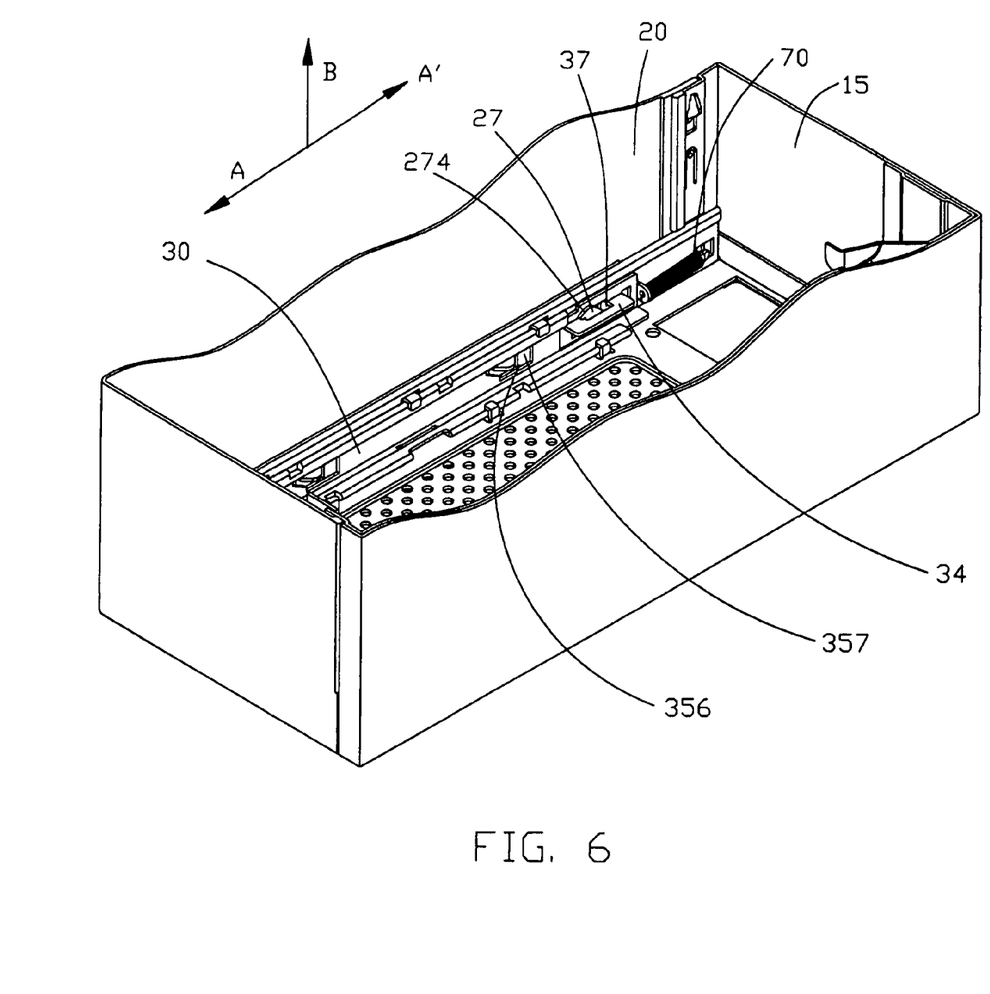
FIG. 6 is a partial assembled view of the hood and the chassis of FIG. 1 attached by the fastener of FIG. 1.

Referring to FIG. 6, the hood 20 is pushed in direction B. The tabs 25 move from the narrow portions 356 of the openings 35 to the wide portions 357. The hooks 27 insert into the slots 37 with the first slopes 274 sliding along edges of the slots 37, and thereby urging the fastener 30 to slide further along direction A. The first slopes 274 of the hooks 27 then slide across edges of the slots 37, and the fastener 30 slides in direction A', which is opposite to the direction A, by resilient force of the spring 70. Then the hooks 27 of the hood 20 engage with the folding flanges 34 of the fastener 30. Thereby the hood 20 is mounted on the chassis 10.

Figure 7:
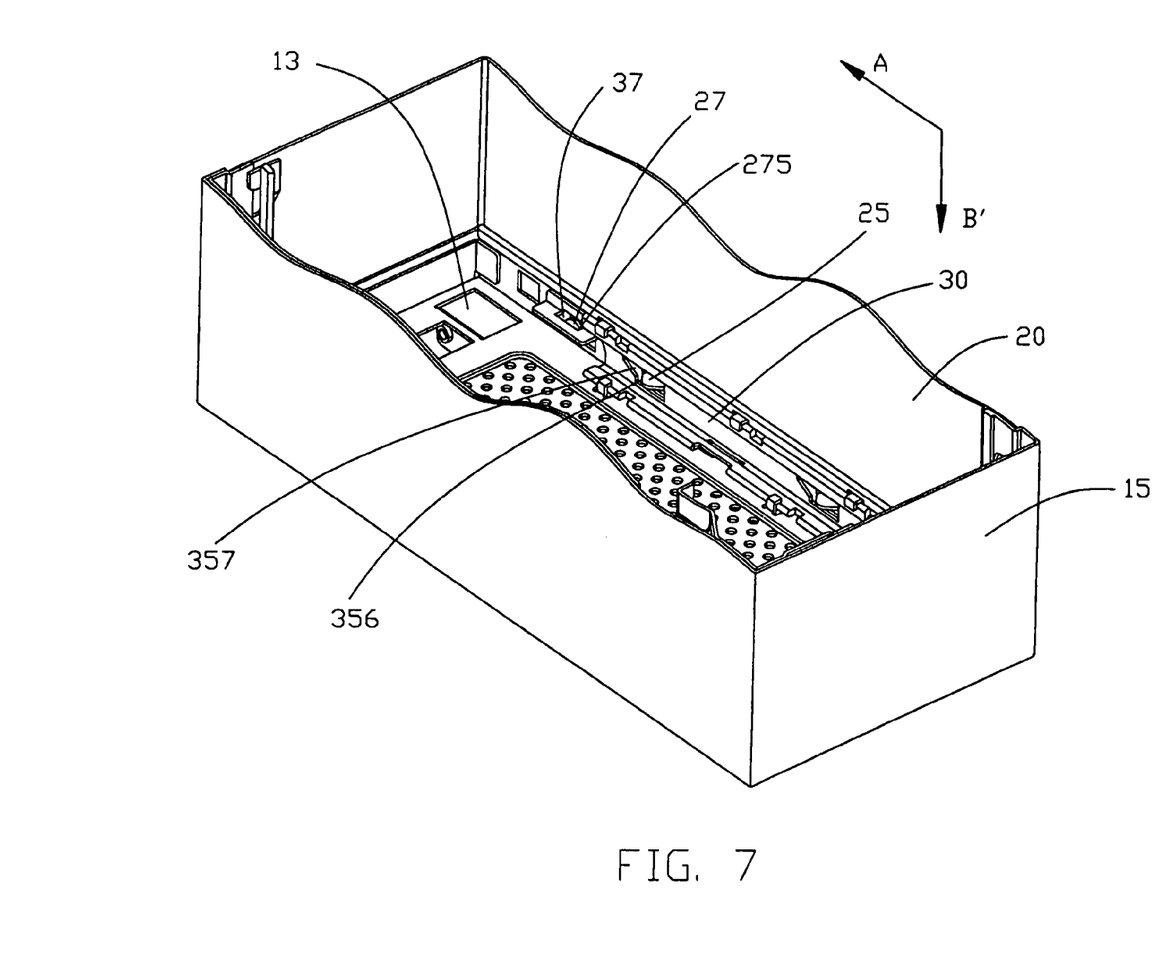
FIG. 7 is a partial pre-disassembled view of disassembling the hood from the chassis.
Figure 8:
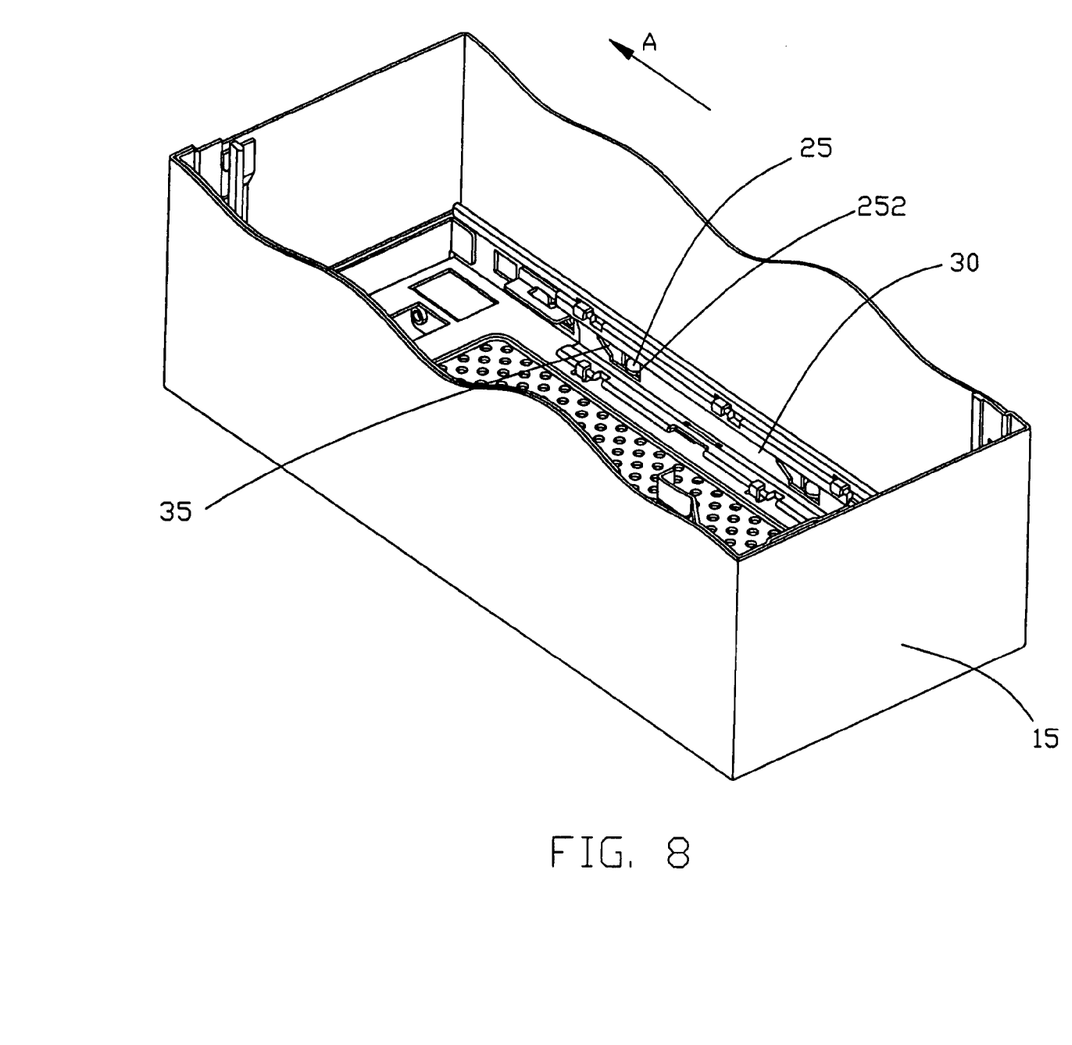
FIG. 8 is an another partial pre-disassembled view of disassembling the hood from the chassis.

Referring to FIGS. 7 and 8, in disassembly, the handle 38 of the fastener 30 is pushed in direction A. The hooks 27 disengage from the folding flanges 34. Edges of the slots 37 guides the second slopes 275 of the hooks 27, and the hood 20 moves in direction B' which is opposite to the direction B. At the same time, the tabs 25 of the hood 20 move from the wide portions 357 of the openings 35 to the narrow portions 356. The handle 38 of the fastener 30 is moved further along direction A. Edges of the openings 35 guides the second chamfers 252 of the tabs 25 and the hood 20 moves upwardly until the tabs 25 escape from the openings 35 completely. Then the handle 38 is released and the fastener 30 moves in direction A' quickly enough by resilient force of the spring 70 to avoid the tabs 25 falling into the openings 35 again. So the hood 20 is in a detachable position and can be removed from the chassis 10.

It is to be understood, however, that even though numerous characteristics and advantages have been set forth in the foregoing description of a preferred embodiment, together with details of the structure and function of the embodiment, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure comprising:
   a chassis with a fastener movably attached thereto, the fastener defining an opening and a slot in different planes, the opening comprising an end surface; and
   a hood comprising a tab corresponding to the opening, and a hook corresponding to the slot, the tab and the hook extending in directions corresponding to the opening and the slot respectively for inserting therein respectively, the tab comprising a chamfer, a distance between the hook and the chamfer being longer than a distance between the slot and the end surface of the opening, the hood mounted on the chassis in such a manner that the hood is placed to align the chamfer of the tab with the end surface of the opening, where the hook is not aligned with the slot of the fastener, the tab is inserted into the opening of the fastener with the end surface of the opening sliding along the chamfer to push the fastener moving to an aligned position where the hook is aligned with the slot of the fastener, and the hook is inserted into the slot to secure the hood to the chassis.

2. The computer enclosure as described in claim 1, wherein the hook comprises a first slope guided by an edge of the slot for engaging in the slot.

3. The computer enclosure as described in claim 1, wherein the hook comprises a second slope guided by an edge of the slot to disengage the hook from the slot, and the tab comprises a second chamfer guided by an edge of the opening to force the tab to escape from the opening.

4. The computer enclosure as described in claim 1, wherein one end of a spring is secured to the chassis, and the other end is secured to the fastener.

5. The computer enclosure as described in claim 1, wherein a plurality of clasps is formed on the chassis, and a plurality of cutouts is defined in the fastener for facilitating attaching the fastener to the clasps.

6. The computer enclosure as described in claim 1, wherein a protrusion is formed from one corner of the opening to divide the opening into a wide portion and a narrow portion.

7. The computer enclosure as described in claim 6, wherein the end surface is formed on the protrusion.

8. The computer enclosure as described in claim 1, wherein the chassis comprises a skirting panel for the fastener attached therebelow.

9. The computer enclosure as described in claim 8, wherein the skirting panel defines a plurality of holes for the tab and the hook extending through.

10. The computer enclosure as described in claim 1, wherein the fastener comprises a first piece extending in a first direction, a portion of the first piece is stamped perpendicularly to form a flange, the opening is defined in the first piece, the slot is defined in the flange, the tab extends in a second direction, the hook extends in a third direction, each one of the first, second, third directions is perpendicular to the other two directions, the tab of the hood is inserted in the opening of the fastener in the second direction to push the fastener moving in the first direction to the aligned position, and the hook is inserted into the slot in the third direction.

11. A computer enclosure comprising:
    a chassis comprising an unclosed side, a fastener movably attached on the chassis via a resilient member which locates the fastener in a first position when the resilient member is in its original status, the fastener defining an opening and a slot; and
    a hood adapted to enclose the unclosed side of the chassis, the hood comprising a tab and a hook, the hood mounted on the chassis in such a manner that the hood is placed to align the tab with the opening, where the hook is not aligned with the slot of the fastener, the tab is inserted into the opening and pushes the fastener moving to an aligned position where the hook is aligned with the slot of the fastener and the resilient member is in its tight status, and the hook is inserted into the slot to secure the hood to the chassis.

12. The computer enclosure as described in claim 11, wherein the fastener comprises a first piece extending in a first direction, a portion of the first piece is stamped perpendicularly to form a flange, the opening is defined in the first piece, the slot is defined in the flange, the tab extends in a second direction, the hook extends in a third direction, each one of the first, second, third directions is perpendicular to the other two directions, the tab of the hood is inserted in the opening of the fastener in the second direction to push the fastener moving in the first direction to the aligned position, and the hook is inserted into the slot in the third direction.

13. The computer enclosure as described in claim 11, wherein the resilient member is a spring with one end secured to the chassis and the other end is secured to the fastener.

14. The computer enclosure as described in claim 11, wherein the opening comprises an end surface, the tab comprises a chamfer, the end surface of the opening slides along the chamfer to push the fastener moving when the tab is inserted into the opening, and a distance between the hook and the chamfer is longer than a distance between the slot and the end surface of the opening.

15. A computer enclosure, comprising:
a chassis comprising an unclosed side, a fastener movably attached on the chassis via a resilient member which locates the fastener in a first position when the resilient member is in its original length, the fastener comprising a first piece extending in a first direction, a portion of the first piece stamped perpendicularly to form a flange, an opening defined in the first piece, a slot defined in the flange; and
a hood adapted to enclose the unclosed side of the chassis, the hood comprising a tab extending in a second direction and a hook extending in a third direction, each one of the first, second, third directions being perpendicular to the other two directions, the hood mounted on the chassis in such a manner that the tab is inserted in the opening of the fastener in the second direction when the fastener is kept in the first position, where the hook of the hood is not aligned with the slot of the fastener, the tab pushes the fastener to move away from the first position in the first direction to an aligned position where the hook of the hood is aligned with the slot of the fastener, and the hood is moved in the third direction to engage the hook into the slot.

16. The computer enclosure as described in claim 15, where the opening comprises an end surface, the tab comprises a chamfer, the end surface of the opening slides along the chamfer to push the fastener moving when the tab is inserted into the opening, and a distance between the hook and the chamfer is longer than a distance between the slot and the end surface of the opening.

* * * * *